(12) United States Patent
Hamm et al.

(10) Patent No.: US 11,655,908 B2
(45) Date of Patent: May 23, 2023

(54) LOW PRESSURE SHUT OFF VALVE AND SYSTEM

(71) Applicant: Engineered Controls International, LLC, Elon, NC (US)

(72) Inventors: Mark Kendrick Hamm, Cullman, AL (US); Christopher Taylor Herman, Greensboro, NC (US); Elijah M. Combs, Mount Airy, NC (US)

(73) Assignee: Engineered Controls International, LLC, Elon, NC (US)

( * ) Notice: Subject to any disclaimer, the term of this patent is extended or adjusted under 35 U.S.C. 154(b) by 0 days.

(21) Appl. No.: 17/594,731

(22) PCT Filed: Apr. 30, 2020

(86) PCT No.: PCT/US2020/030781
§ 371 (c)(1),
(2) Date: Oct. 27, 2021

(87) PCT Pub. No.: WO2020/223513
PCT Pub. Date: Nov. 5, 2020

(65) Prior Publication Data
US 2022/0213969 A1    Jul. 7, 2022

Related U.S. Application Data

(60) Provisional application No. 62/842,294, filed on May 2, 2019.

(51) Int. Cl.
*F16K 17/04* (2006.01)
*F16K 31/40* (2006.01)

(52) U.S. Cl.
CPC ........ *F16K 17/048* (2013.01); *F16K 17/0473* (2013.01); *F16K 31/402* (2013.01); *Y10T 137/7761* (2015.04)

(58) Field of Classification Search
CPC ......... Y10T 137/1939; Y10T 137/7761; Y10T 137/7759; Y10T 137/7762;
(Continued)

(56) References Cited

U.S. PATENT DOCUMENTS 1,567,995 A * 12/1925 Kimball ............... G05D 16/202
                                                       137/505.22
2,329,001 A *  9/1943 Robinson ............. F16K 31/406
                                                           251/44
(Continued)

FOREIGN PATENT DOCUMENTS

GB          2359891      9/2001
WO     WO1998017935      4/1998

OTHER PUBLICATIONS

International Search Report and Written Opinion for PCT/US2020/030781 dated Aug. 3, 2020, 10 pp.

*Primary Examiner* — Robert K Arundale
(74) *Attorney, Agent, or Firm* — Neal, Gerber & Eisenberg LLP

(57) ABSTRACT

A CO2 low-pressure shut-off system is described. The low-pressure shut-off system may include a low-pressure shut-off valve including a first valve inlet, a second valve inlet and at least one valve outlet, a solenoid valve including a valve inlet, a first valve outlet, and a second valve outlet. The solenoid may be configured to direct a flow of a pressurized gas from the valve inlet into at least one of the first valve outlet and the second valve outlet. The CO2 low-pressure shut-off system further includes a gas monitor electrically coupled to the solenoid valve. The gas monitor may be configured to transmit one of a first signal and a second signal to the solenoid valve to control the flow of the pressurized gas through the solenoid valve.

20 Claims, 4 Drawing Sheets

(58) Field of Classification Search
CPC ......... Y10T 137/7769; Y10T 137/7781; Y10T 137/7782; Y10T 137/7787; F16K 31/406
USPC .................. 251/30.01, 62, 63, 63.5, 63.6
See application file for complete search history.

(56) References Cited

U.S. PATENT DOCUMENTS

| | | | | |
|---|---|---|---|---|
| 2,799,466 | A * | 7/1957 | Hickerson | F16K 31/406 251/44 |
| 3,788,400 | A * | 1/1974 | Tufts | A62C 35/645 251/44 |
| 3,880,186 | A * | 4/1975 | Turner | F23N 1/005 251/29 |
| 4,081,171 | A * | 3/1978 | Morgan | B01D 29/70 251/30.02 |
| 4,135,696 | A * | 1/1979 | Saarem | F16K 31/402 251/30.02 |
| 4,360,037 | A * | 11/1982 | Kendall | F16K 31/402 251/30.05 |
| 4,673,162 | A * | 6/1987 | Lachmann | F16K 31/383 251/30.01 |
| 5,000,224 | A * | 3/1991 | Olson, Jr. | F17D 5/00 137/487.5 |
| 5,062,443 | A | 11/1991 | Maric | |
| 5,082,143 | A | 1/1992 | Schramm, Jr. | |
| 5,090,436 | A | 2/1992 | Hoch, Jr. et al. | |
| 5,425,270 | A * | 6/1995 | McDonald | F16K 37/0091 702/50 |
| 5,730,323 | A | 3/1998 | Osborne | |
| 5,868,162 | A | 2/1999 | Dickerson, Jr. | |
| 5,871,121 | A | 2/1999 | Hashimoto et al. | |
| 5,979,482 | A * | 11/1999 | Scott | F16K 31/402 137/15.01 |
| 6,095,484 | A * | 8/2000 | Frenkel | F16K 7/126 137/488 |
| 6,251,105 | B1 | 6/2001 | Mikus et al. | |
| 6,253,784 | B1 * | 7/2001 | Simoens | F16K 31/406 251/30.01 |
| 7,114,707 | B2 | 10/2006 | Rona et al. | |
| 7,288,276 | B2 | 10/2007 | Rona et al. | |
| 7,918,367 | B2 | 4/2011 | O'Donnell | |
| 8,011,539 | B1 | 9/2011 | O'Donnell et al. | |
| 8,172,197 | B2 | 5/2012 | Gu et al. | |
| 8,689,829 | B2 * | 4/2014 | Meikle | G01F 15/001 251/30.02 |
| 8,844,555 | B2 | 9/2014 | Schneider | |
| 10,119,749 | B2 | 11/2018 | Baek et al. | |
| 11,391,392 | B2 * | 7/2022 | Niess | F16K 31/402 |
| 2001/0040227 | A1 * | 11/2001 | Zakai | F16K 31/402 251/25 |
| 2004/0084088 | A1 * | 5/2004 | Callies | G05D 16/0672 137/495 |
| 2004/0094735 | A1 | 5/2004 | Shin | |
| 2005/0205815 | A1 * | 9/2005 | Frenkel | F16K 7/126 251/61.1 |
| 2009/0236904 | A1 | 9/2009 | Ripley et al. | |
| 2010/0224804 | A1 | 9/2010 | Sneh | |
| 2010/0276615 | A1 * | 11/2010 | Borst | F16K 31/402 251/30.01 |
| 2013/0045311 | A1 * | 2/2013 | Cloud | A23G 9/28 222/52 |
| 2013/0092134 | A1 * | 4/2013 | Zurke | F04D 25/04 123/564 |
| 2015/0168246 | A1 | 6/2015 | Penning et al. | |
| 2017/0284602 | A1 | 10/2017 | Song et al. | |
| 2017/0284603 | A1 | 10/2017 | Song et al. | |
| 2018/0112794 | A1 * | 4/2018 | Challen | F16K 17/383 |

\* cited by examiner

LOW PRESSURE SHUT OFF VALVE AND SYSTEM

CROSS-REFERENCE

This application is a U.S. national phase application of PCT/US2020/030781, filed on Apr. 30, 2020, which claims the benefit of U.S. Provisional Patent App. No. 62/842,294, filed on May 2, 2019. These prior applications are incorporated by reference herein in their entireties.

TECHNICAL FIELD

This disclosure generally relates to a low-pressure shut-off valve and system for monitoring the pressure of a pressurized fluid receptacle (e.g., a tank, cylinder, or conduit).

BACKGROUND

Low-pressure shut-off valves divert or otherwise close off the flow of a pressurized fluid from a pressurized fluid receptacle (e.g., tank or cylinder). Closing off or diverting the fluid flow from the pressurized fluid receptacle is desirable if the pressurized fluid falls above or below a desired fluid pressure. For example, a pressurized fluid tank or cylinder may hold a fluid such as liquefied carbon dioxide ($CO_2$), compressed natural gas, liquefied nitrogen, liquefied natural gas, and other such gases and fluids. The pressurized fluid tank or cylinder may be configured to supply or otherwise generate a flow of pressurized gas or other such pressurized fluid through a pressurized fluid conduit. A shut-off valve monitors the pressure of the fluid flowing through the conduit and cuts off or diverts the pressurized fluid flow when an abnormal pressure is detected.

A low-pressure shut-off valve may be connected to and in fluid communication with the pressurized fluid tank or cylinder. The low-pressure shut-off valve may be configured to monitor the pressurized fluid flow produced by the pressurized fluid tank, and to cut off or otherwise divert the pressurized fluid flow if the fluid pressure falls below a desired fluid pressure.

SUMMARY

This application is defined by the appended claims. The description summarizes aspects of the embodiments and should not be used to limit the claims. Other implementations are contemplated in accordance with the techniques described herein, as will be apparent upon examination of the following drawings and detailed description, and such implementations are intended to be within the scope of this application.

The present disclosure relates to a CO2 low-pressure shut-off system. In an embodiment, the CO2 low-pressure shut-off system includes a low-pressure shut-off valve including a first valve inlet, a second valve inlet and at least one valve outlet, a solenoid valve including a valve inlet, a first valve outlet, and a second valve outlet, the second valve outlet connected to and in fluid communication with the first valve inlet of the low-pressure shut-off valve. The solenoid may be configured to direct a flow of a pressurized gas from the valve inlet into at least one of the first valve outlet and the second valve outlet. The CO2 low-pressure shut-off system further includes a gas monitor electrically coupled to the solenoid valve. The gas monitor may be configured to transmit one of a first signal and a second signal to the solenoid valve to control the flow of the pressurized gas through the solenoid valve.

DETAILED DESCRIPTION

Figure 1A:
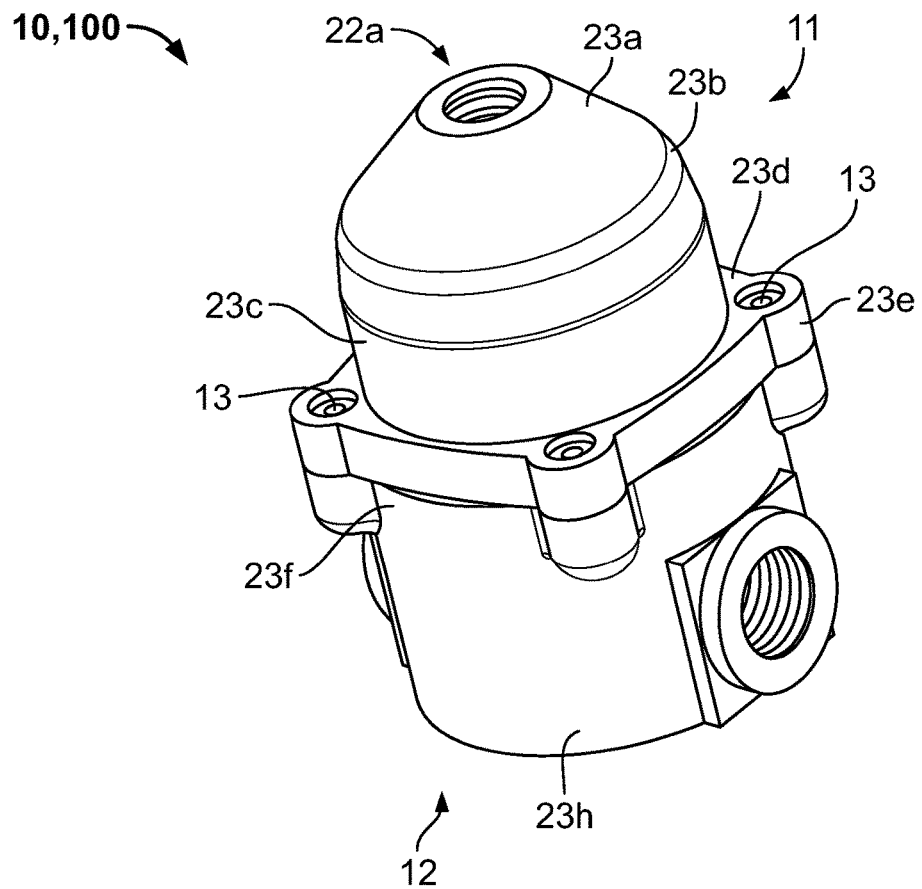
FIG. 1A is a perspective view of a low-pressure shut-off valve.

While the features, methods, devices, and systems described herein may be embodied in various forms, there are shown in the drawings, and will hereinafter be described, some exemplary and non-limiting embodiments. Not all of the depicted components described in this disclosure may be required, however, and some implementations may include additional, different, or fewer components from those expressly described in this disclosure. Variations in the arrangement and type of the components may be made without departing from the spirit or scope of the claims as set forth herein.

Figure 1B:
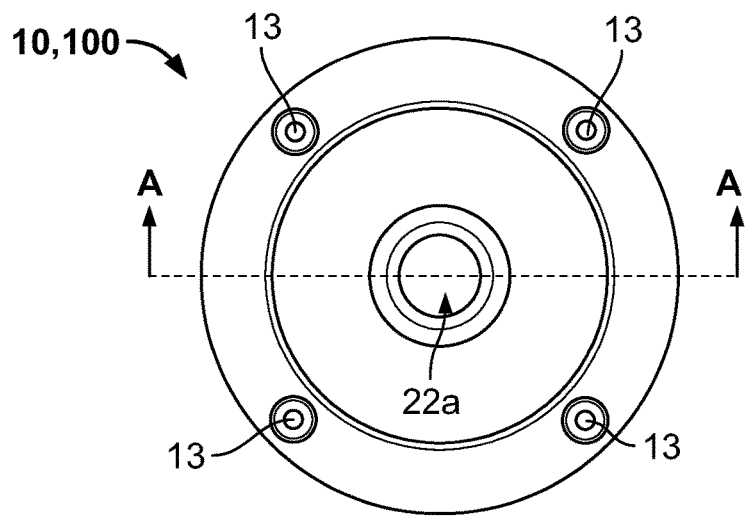
FIG. 1B is a top view of the low-pressure shut-off valve of FIG. 1A.
Figure 2:
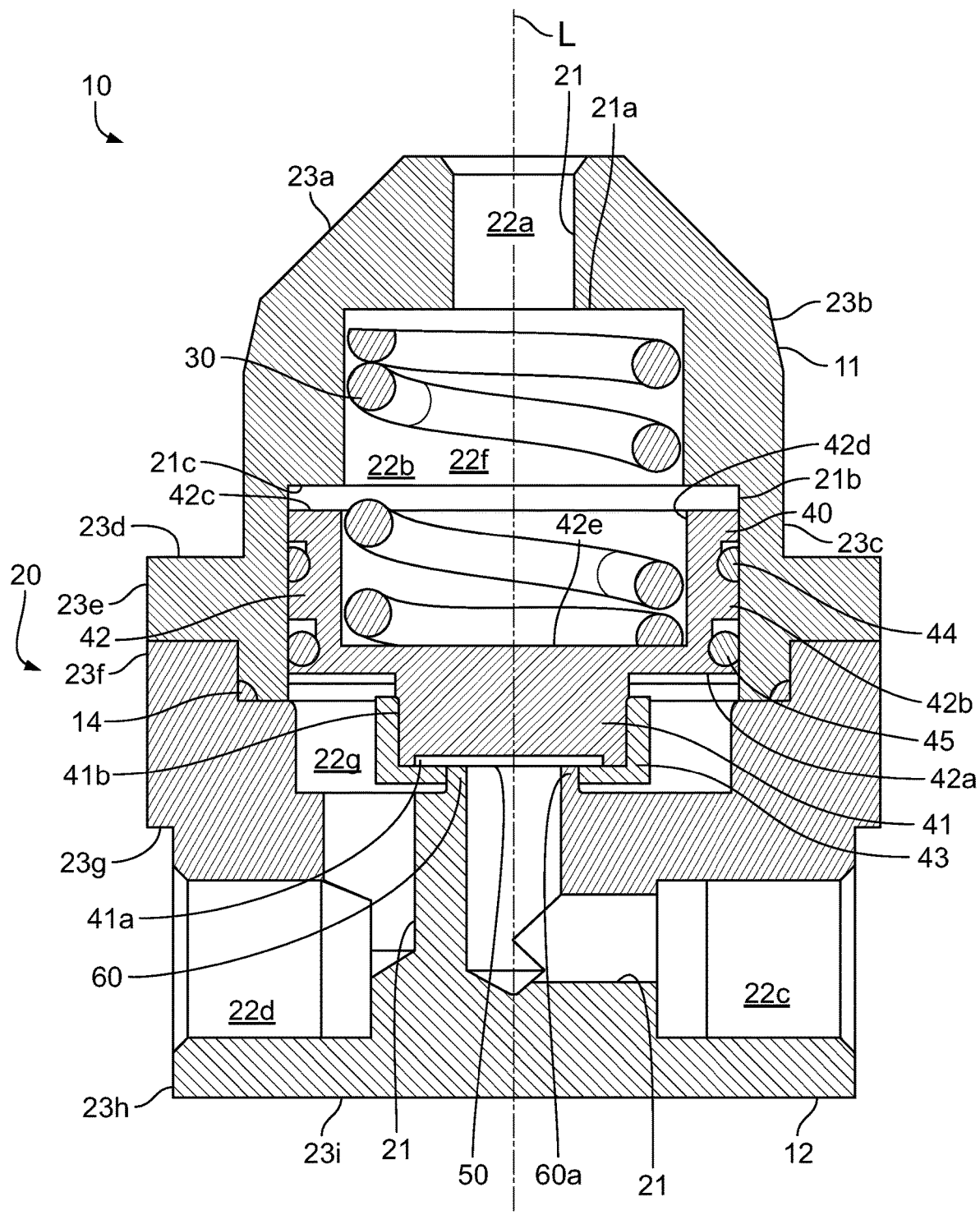
FIG. 2 is a cross sectional side view of a first embodiment of the low-pressure shut-off valve taken along line A-A of FIG. 1B.

FIGS. 1A, 1B, and 2 illustrate one exemplary embodiment of a low-pressure shut-off valve 10. The low-pressure shut-off valve 10 (sometimes referred to herein as shut-off valve 10 for brevity) includes a body 20, a spring 30, a piston 40, a seat disc diaphragm 50, and a valve seat 60.

The body 20 houses spring 30, piston 40, and the seat disc diaphragm 50. The body 20 has a longitudinal axis L and includes a plurality of inner surfaces 21 that may be parallel, perpendicular, and/or sloped with the respect to the longitudinal axis L. The plurality of inner surfaces 21 define a plurality of voids or passages 22 within body 20. Body 20 also includes multiple outer surfaces 23.

A cylindrical inlet passage 22a (i.e., first inlet passage) is defined by one or more inner surfaces 21 of body 20. At least a portion of the plurality of inner surfaces 21 which define the inlet passage 22a may be a threaded surface. The plurality of inner surfaces 21 further define a cylindrical void 22b within body 20. Furthermore, the cylindrical void 22b is configured to house spring 30 and piston 40 within body 20. The piston 40 divides the cylindrical void 22b into void 22f and void 22g on opposing sides of the piston 40. In the illustrated example, the inlet passage 22a is connected to and in fluid communication with the void 22f in which the spring 30 is positioned.

An inlet passage 22d (i.e., second inlet passage) is defined within body 20. In some examples, at least a portion of the plurality of inner surfaces 21 that define the inlet passage 22d may be threaded surfaces. Furthermore, the inlet passage 22d is connected to and in fluid communication with the void 22g. In the illustrated example, portions of the inlet passage 22d may be defined parallel to the longitudinal axis L, perpendicular to the longitudinal axis L, sloped to the longitudinal axis L, or any combinations thereof.

An outlet passage 22c (i.e., first outlet passage) is defined within body 20. In some examples, at least a portion of the plurality of inner surfaces 21 that define the outlet passage 22c may be threaded surfaces. Furthermore, the outlet passage 22c is selectively connected to and in fluid communication with the void 22g. In the illustrated example, portions of the outlet passage 22c may be defined parallel to the longitudinal axis L, perpendicular to the longitudinal axis L, sloped to the longitudinal axis L, or any combinations thereof. Thus, the inlet passage 22d, the void 22g, and the outlet passage 22c collectively define a first fluid pathway from the exterior of shut-off valve 10 into the inlet passage 22d, through the void 22g, and out through the outlet passage 22c.

Additionally, a second outlet passage 22e (shown schematically in FIG. 5) may be further defined within the plurality of interior surfaces of body 20. In some examples, the second outlet passage 22e is a cylindrical passage connected to and in fluid communication with the inlet passage 22d. As such, the inlet passage 22d and the second outlet passage 22e collectively define a second fluid pathway from the exterior of shut-off valve 10 into the inlet passage 22d and out through the second outlet passage 22e.

A first outer surface 23a of body 20 is sloped at an angle (e.g., 45 degrees) with respect to the longitudinal axis L. A second outer surface 23b is sloped with respect to the longitudinal axis L. In the illustrated example, the second outer surface 23b is sloped at a steeper angle (e.g., 75 degrees) than the first outer surface 23a. The second outer surface 23b connects the first outer surface 23a with a third outer surface 23c. The third outer surface 23c is parallel with the longitudinal axis L. A fourth outer surface 23d perpendicularly joins the third outer surface 23c with a fifth outer surface 23e. The fifth outer surface 23e is parallel to the longitudinal axis L. The outer surfaces 23a to 23e collectively define a top piece 11 of body 20. A sixth outer surface 23f is parallel to the longitudinal axis L and aligns with the fifth outer surface 23e. A seventh outer surface 23g perpendicularly connects the sixth outer surface 23f with an eighth outer surface 23h. A ninth outer surface 23i is perpendicular to the longitudinal axis L and is connected to the eighth outer surface 23h. In the illustrated example, the ninth outer surface 23i defines a bottom surface of shut-off valve 10 and the second outlet passage 22e may be formed or defined to otherwise extend from an interior portion of body 20 through the ninth outer surface 23i to the exterior of shut-off valve 10. The outer surfaces 23f to 23i collectively define a bottom portion of body 20.

In the illustrated example, top piece 11 and bottom piece 12 are assembled together to form shut-off valve 10. The top and bottom pieces 11 and 12 are fastened together by a plurality of fasteners 13 (e.g., screws). In other embodiments, the top and bottom pieces 11 and 12 are coupled together via other fastening mechanisms, such as internal threads of the top piece 11 and corresponding external threads of the bottom piece 12. Further, in the illustrated example, the top piece 11 (i.e., valve bonnet) includes the inlet passage 22a and an upper portion of the cylindrical void 22b (e.g., including the void 22f). The bottom piece 12 (i.e., lower body) includes the lower portion of the cylindrical void 22b (e.g., including the void 22g), the inlet passage 22d, the outlet passage 22c, and the second outlet passage 22e. Furthermore, an O-ring 14 may be disposed between and sealingly engaged with the top piece 11 and the bottom piece 12 to provide a seal where the top and bottom pieces 11 and 12 mate or otherwise fit together.

As further shown in FIG. 2, piston 40 is positioned within the cylindrical void 22b of body 20 in a manner that defines the void 22f and the void 22g. The piston includes a receiver 41 and a guide member 42. The receiver 41 is generally a protrusion that extends axially from the guide member 42. The receiver 41 has a first receiver surface 41a perpendicular to the longitudinal axis L and connected to a second receiver surface 41b. The second receiver surface 41b is parallel to the longitudinal axis L. The receiver 41 is configured to receive the seat disc diaphragm 50. In some examples, at least a portion of the second receiver surface 41b is a threaded surface configured to mate with a piston cap screw 43. The piston cap screw 43 is threaded onto the receiver 41 such that the seat disc diaphragm 50 is attached or otherwise fastened to the first receiver surface 41a.

The guide member 42 has a first guide member surface 42a perpendicularly connected to the second receiver surface 41b. A second guide member surface 42b connected to the first guide member surface 42a and parallel to the longitudinal axis L. A third guide member surface 42c perpendicularly connects to the second guide member surface 42b and to a fourth guide member surface 42d. The fourth guide member surface 42d is parallel to the longitudinal axis L. The fourth guide member surface 42d connects to a fifth guide member surface 42e that is perpendicular to the longitudinal axis L.

As best illustrated in FIG. 2, piston 40 is sized and shaped to be received in the second cylindrical void 22b of body 20 in a manner that defines the void 122f and the void 122g. The piston 40 also is configured to receive at least a portion of spring 30. In the illustrated example, the spring is received in void 22f of the second cylindrical void 22b and disposed between an inner surface 21a of body 20 and the fifth guide member surface 42e of the guide member 42. The guide member 42 is a generally annular structure that aligns piston 40 and spring 30 with respect to body 20. The second guide member surface 42b is configured as a first body engaging surface that is slidingly engaged with an inner surface 21b of body 20. Moreover, the third guide member surface 42c is configured as a second body engaging surface that engages an inner surface 21c of body 20. Furthermore, engagement between the third guide member surface 42c and the inner surface 21c may limit the amount of axial displacement of piston 40 within the cylindrical void 22b of body 20.

In the illustrated example, the guide member 42 includes a first (or top) piston O-ring 44 and a second (or bottom) piston O-ring 45 circumferentially disposed around the second guide member surface 42b. As such, the first and second piston O-ring 44 and 45 are sealingly engaged with the inner surface 21b of body 20 when piston 40 is disposed within the cylindrical void 22b of body 20 to separate the void 22f from the void 22g.

As best shown in FIG. 2, valve seat 60 is a generally annular structure that axially extends into the cylindrical void 22b and circumferentially surrounds an interior opening of the outlet passage 22c defined in body 20. Furthermore, the valve seat 60 includes a valve seat sealing surface 60a, that defines a circumferential surface that sealingly engages with the seat disc diaphragm 50 when shut-off valve 10 is in the closed position.

More specifically, piston 40 and attached seat disc diaphragm 50 are movable between a sealed position and an unsealed position. When piston 40 and attached seat disc diaphragm 50 are in the sealed position, the seat disc diaphragm 50 is sealingly engaged with the valve seat sealing surface 60a to prevent pressurized fluid (e.g., pressurized CO2 gas) from flowing through shut-off valve 10 (i.e., fluid is closed off from flowing through the cylindrical void 22b and out through the outlet passage 22c). Alternatively, when piston 40 and attached seat disc diaphragm 50 are in the unsealed position, the seat disc diaphragm 50 is displaced from (and does not sealingly engage) the valve seat sealing surface 60a. Thus, pressurized fluid (e.g., pressurized CO2 gas) can flow through shut-off valve 10 (i.e., into the inlet passage 22d, through the void 22g, and out through the outlet passage 22c).

In operation, the inlet passage 22d of shut-off valve 10 is suitably attached to a pressurized fluid source (e.g., pressurized fluid source 230 and 330 in FIGS. 4 and 5) which stores and supplies a pressurized fluid (e.g., CO2 gas). Accordingly, the inlet passage 22d is in constant fluid communication with the pressurized fluid source. Furthermore, the outlet passage 22c of shut-off valve 10 is suitably attached to equipment requiring the pressurized fluid (e.g., carbonated beverage machine 240 and 340 of FIGS. 4 and 5).

The inlet passage 22d is also in constant fluid communication with the void 22g. Accordingly, the pressurized fluid flowing through the inlet passage 22d acts on the piston 40. The pressurized fluid flowing through the inlet passage 22d further acts against the biasing force that spring 30 exerts against piston 40 and the valve seat 60. Spring 30 is configured to exert a biasing force that corresponds to a low-pressure threshold (i.e., 80 psi) of the pressurized fluid flowing through shut-off valve 10. Thus, when the pressurized fluid entering the inlet passage 22d exceeds the threshold pressure (e.g., 80 psi or greater), and specifically when the force the pressurized fluid imposes on the piston 40 exceeds the biasing force of spring 30, the seat disc diaphragm 50 is disengaged from the valve seat 60 (i.e., seat disc diaphragm is positioned in the unsealed position). Accordingly, shut-off valve 10 is open to enable fluid to flow from the pressurized fluid source through the inlet passage 22d and out through the bottom outlet passage 22c.

Figure 3:
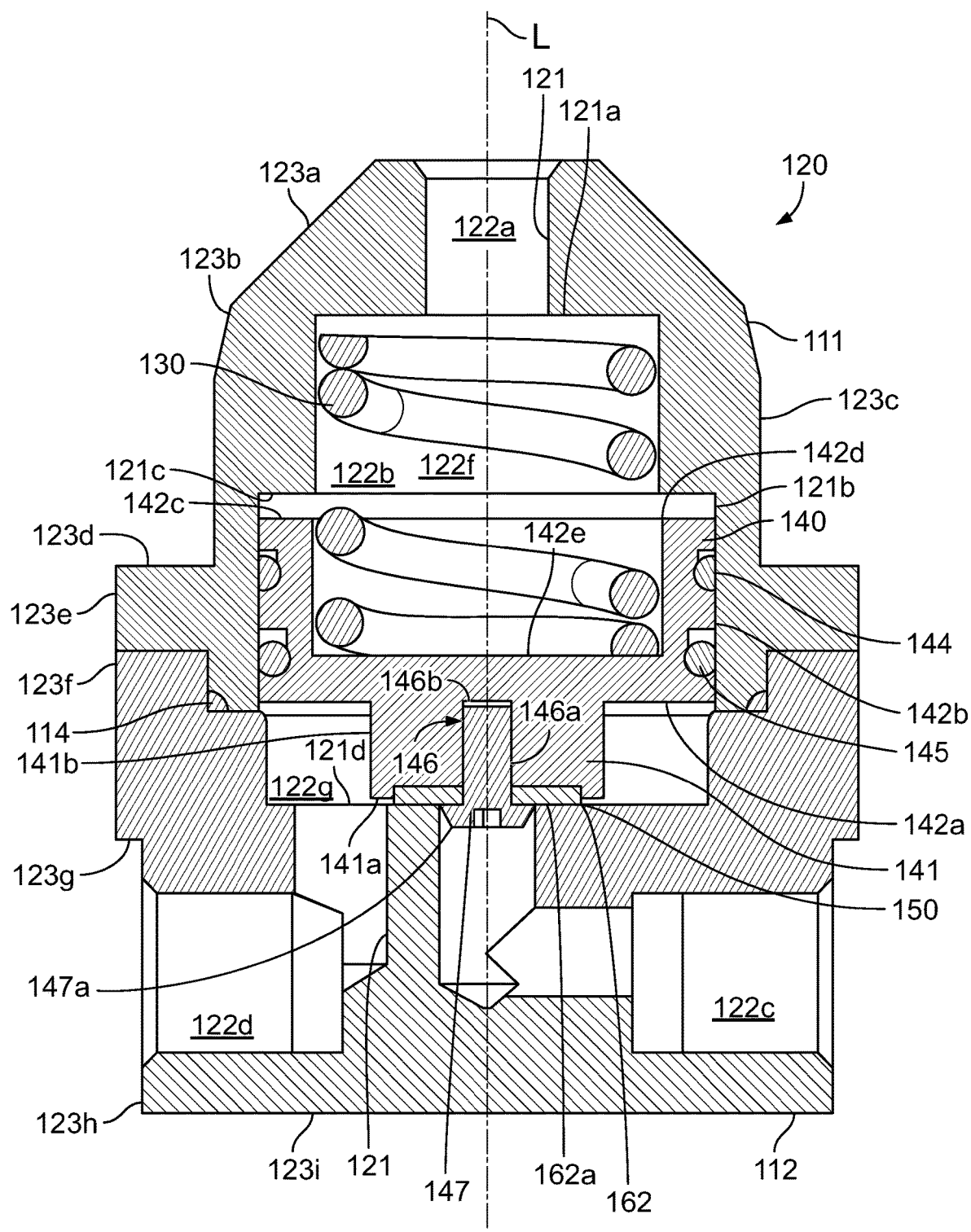
FIG. 3 is a cross sectional side view of the second embodiment of the low-pressure shut-off valve taken along line A-A of FIG. 1B.

FIG. 3 illustrates a second embodiment of a low-pressure shut-off valve 100. It should be appreciated that the outer surfaces illustrated in FIGS. 1A and 1B for low-pressure shut-off valve 100 are identical to low-pressure shut-off valve 10 described above. As such, element numbers used below with respect to FIG. 3 are identical to the corresponding element numbers used above with respect to FIG. 2 with an additional "1" at the beginning of the element labels (e.g., 23a becomes 123a, 23b becomes 123b, and the like).

FIG. 3 is a cross section of the second embodiment of the low-pressure shut-off valve 100 disclosed herein. It should be appreciated that the first embodiment and the second embodiment are similar except for the differences discussed below. It should also be appreciated that the general operation of the first embodiment is the same as the general operation of the second embodiment, except as discussed below. It should therefore be appreciated that all disclosure related to the first embodiment applies to the second embodiment, except where such disclosure is inconsistent with the elements of the second embodiment, as discussed below. Additionally, the disclosures with respect to FIG. 2 are relevant to the second embodiment and the disclosures of FIG. 3 are relevant to the first embodiment.

The low-pressure shut-off valve 100 (sometimes referred to herein as shut-off valve 100 for brevity) includes a body 120, a spring 130, a piston 140, a seat disc diaphragm 150, and a valve seat 162. As discussed above, the low-pressure shut-off valve 100 shares many elements that are identical to the low-pressure shut-off valve 10, except for the differences discussed below. As such, element numbers used below with respect to FIG. 3 are identical to the corresponding element numbers used above with respect to FIG. 2 with an additional "1" at the beginning of the element labels (e.g., 22a becomes 122a, 30 becomes 130, and the like).

The body 120 houses spring 130, piston 140, and seat disc diaphragm 150. The body 120 has a longitudinal axis L and includes multiple inner surfaces 121 defining multiple voids 122. The body also includes multiple outer surfaces 123.

An inlet passage 122a (i.e., first inlet passage) is defined by one or more inner surfaces 121 of the body 120. At least a portion of the plurality of inner surfaces 121 which define the inlet passage 122a may be a threaded surface. A plurality the inner surfaces 121 further define a cylindrical void 122b within the body 120. Furthermore, the cylindrical void 122b is configured to house spring 30 and piston 140 within the body 120. The piston 140 divides the cylindrical void 122b into void 122f and void 122g on opposing sides of the piston 140. In the illustrated example, the inlet passage 122a is connected to and in fluid communication with the void 122f in which the spring 130 is positioned.

An inlet passage 122d (i.e., second inlet passage) is defined within the body 120. In some examples, at least a portion of the plurality of inner surfaces 121 that define the inlet passage 122d may be threaded surfaces. Furthermore, inlet passage 122d is connected to and in fluid communication with the void 122g. In the illustrated example, portions of inlet passage 122d may be defined parallel to the longitudinal axis L, perpendicular to the longitudinal axis L, sloped to the longitudinal axis L, or any combinations thereof.

An outlet passage 122c (i.e. first outlet passage) is defined within body 120. In some examples, at least a portion of the plurality of inner surfaces 121 that define the outlet passage 122c may be threaded surfaces. Furthermore, the outlet passage 122c is selectively connected to and in fluid communication with the void 122g. In the illustrated example, portions of the outlet passage 122c may be defined parallel to the longitudinal axis L, perpendicular to the longitudinal axis L, sloped to the longitudinal axis L, or any combinations thereof. Thus, the inlet passage 122d, the void 122g, and the outlet passage 122c collectively define a first fluid pathway from the exterior of shut-off valve 100 into the inlet passage 122d, through the void 122g, and out through the outlet passage 122c.

Additionally, a second outlet passage 122e (shown schematically in FIG. 5) may be further defined within the plurality of interior surfaces of body 120. In some examples, second outlet passage 122e is a cylindrical passage connected to and in fluid communication with inlet passage 122d. As such, inlet passage 122d and second outlet passage 122e collectively define a second fluid pathway from the exterior of shut-off valve 100 into inlet passage 122d and out through second outlet passage 122e.

A first outer surface 123a of the body 120 is sloped at an angle (e.g., 45 degrees) with respect to the longitudinal axis L. A second outer surface 123b is sloped with respect to the longitudinal axis L. In the illustrated example, the second outer surface 123b is sloped at a steeper angle (e.g., 75 degrees) than the first outer surface 123a. The second outer surface 123b connects the first outer surface 123a with a third outer surface 123c. The third outer surface 123c is parallel with the longitudinal axis L. A fourth outer surface 123d perpendicularly joins the third outer surface 123c with a fifth outer surface 123e. The fifth outer surface 123e is parallel to the longitudinal axis L. The outer surfaces 123a to 123e collectively define a top piece 111 of the body 120. A sixth outer surface 123f is parallel to the longitudinal axis L and aligns with the fifth outer surface 123e. A seventh outer surface 123g perpendicularly connects the sixth outer surface 123f with an eighth outer surface 123h. A ninth outer surface 123i is perpendicular to the longitudinal axis L and is connected to eighth outer surface 123h. In the illustrated example, the ninth outer surface 123i defines a bottom surface of shut-off valve 100 and second outlet passage 122e may be formed or defined to otherwise extend from an interior portion of body 120 through ninth outer surface 123i to the exterior of shut-off valve 100. The outer surfaces 123f to 123i collectively define a bottom portion of body 120.

In the illustrated example, top piece 111 and bottom piece 112 are assembled together to form the shut-off valve 100. The top and bottom piece 111 and 112 are fastened together by a plurality of fasteners 113 (e.g., screws). In the illustrated example top piece 111 (i.e., valve bonnet) includes inlet passage 122a and an upper portion of cylindrical void 122b (e.g., including the void 122f). The bottom piece 112 (i.e., lower body) includes the lower portion of cylindrical void 122b (e.g., including the void 122g), inlet passage 122d, outlet passage 122c, and second outlet passage 122e. Furthermore, an O-ring 114 may be disposed between and sealingly engaged with the top piece 111 and the bottom piece 112 to provide a seal where top and bottom pieces 111 and 112 mate or otherwise fit together.

As further shown in FIG. 3, piston 140 is positioned within the cylindrical void 122b of the body 120. The piston 140 includes a receiver 141 and a guide member 142. The receiver 141 is generally a protrusion that extends axially from the guide member 142. The receiver 141 has a first receiver surface 141a perpendicular to the longitudinal axis L and connected to a second receiver surface 141b. The second receiver surface 141b is parallel to the longitudinal axis L. The receiver 141 is configured to receive the seat disc diaphragm 150. In the illustrated example, the receiver 141 includes a receiver bore 146 that is defined or otherwise formed to extend through a portion of the receiver 141. As such, the receiver bore 146 does not extend completely through the receiver 141. In the illustrated example, the receiver bore 146 extends axially from the first receiver surface 141a along a bore first surface 146a. The bore first surface 146a is a threaded surface that is parallel to the longitudinal axis L. Furthermore, the bore first surface 146a is perpendicularly connected to a bore second surface 146b. The bore second surface 146b defines a bore termination surface within the receiver 141 that is axially interior from the first receiver surface 141a. A piston screw 147 is threaded into the receiver bore 146 such that the seat disc diaphragm 150 is attached to or otherwise fastened to the first receiver surface 141a. In the illustrated example, a piston screw head 147a of the piston screw 147 has a diameter that is slightly smaller than the upper portion of the outlet passage 122c defined within the body 120. Thus, when shut-off valve 100 is in the closed position, the piston screw head 147a is received within the upper portion of the outlet passage 122c.

The guide member 142 has a first guide member surface 142a perpendicularly connected to the second receiver surface 141b. A second guide member surface 142b connected to the first guide member surface 142a and parallel to the longitudinal axis L. A third guide member surface 142c perpendicularly connects to the second guide member surface 142b and to a fourth guide member surface 142d. The fourth guide member surface 142d is parallel to the longitudinal axis L. The fourth guide member surface 142d connects to a fifth guide member surface 142e that is perpendicular to the longitudinal axis L.

As best illustrated in FIG. 3, piston 140 is sized and shaped to be received in the cylindrical void 122b of body 120 in a manner that defines the void 122f and the void 122g. Furthermore, piston 140 is configured to receive at least a portion of the spring 130. In the illustrated example, the spring 130 is received in the void 122f of the cylindrical void 122b and disposed between an inner surface 121a of body 20 and the fifth guide member surface 142e of the guide member 142. The guide member 142 is a generally annular structure that aligns piston 140 and spring 130 with respect to body 120. The second guide member surface 142b is configured as a first body engaging surface that is slidingly engaged with an inner surface 121b of body 120. Moreover, the third guide member surface 142c is configured as a second body engaging surface that engages an inner surface 121c of body 120. Furthermore, engagement between third guide member surface 42c and inner surface 121c may limit the amount of axial displacement of piston 140 within cylindrical void 122b of body 120.

In the illustrated example, the guide member 142 includes a first (or top) piston O-ring 144 and a second (or bottom) piston O-ring 145 circumferentially disposed around the second guide member surface 142b. As such, the first and second piston O-ring 144 and 145 are sealingly engaged with the inner surface 121b of the body 120 when piston 140 is disposed within the cylindrical void 122b of the body 120 to separate the void 122f and the void 122g.

As best shown in FIG. 3, the valve seat 162 is a generally planar surface defined along an inner surface 121d of the body 120. As such, the valve seat 162 includes a valve seat sealing surface 162a along the inner surface 121d, that sealingly engages with the seat disc diaphragm 150 when shut-off valve 100 is in the closed position.

More specifically, piston 140 and attached seat disc diaphragm 150 are movable between a sealed position and an unsealed position. When piston 140 and attached seat disc diaphragm 150 are in the sealed position, the seat disc diaphragm 150 sealingly engages with the valve seat sealing surface 162a to prevent pressurized fluid (e.g., pressurized CO2 gas) from flowing through the shut-off valve 100 (i.e., fluid is closed off from flowing through the void 122g and out through the outlet passage 122c). Alternatively, when piston 140 and attached seat disc diaphragm 150 are in the unsealed position, the seat disc diaphragm 150 is displaced from (and does not sealingly engage) the valve seat sealing surface 162a. Thus, pressurized fluid (e.g., pressurized CO2 gas) can flow through shut-off valve 100 (i.e., in the inlet passage 122d, through the void 122g, and out through the outlet passage 122c).

In operation, the inlet passage 122d of shut-off valve 100 is suitably attached to a pressurized fluid source (e.g., pressurized fluid source 230 and 330 in FIGS. 4 and 5) which stores and generates a pressurized fluid (e.g., CO2 gas). Accordingly, the inlet passage 122d is in constant fluid communication with the pressurized fluid source. Furthermore, the outlet passage 122c of shut-off valve 100 is suitably attached to equipment requiring the pressurized fluid (e.g., carbonated beverage machine 240 and 340 of FIGS. 4 and 5).

The inlet passage 122d is also in constant fluid communication with the void 122g. Accordingly, the pressurized fluid flowing through the inlet passage 122d acts on the piston 140 disposed within the cylindrical void 122b. The pressurized fluid flowing through the inlet passage 122d further acts against the biasing force the spring 130 exerts against piston 140 and the valve seat 160. The spring 130 is configured to exert a biasing force that corresponds to a low-pressure threshold (i.e., 80 psi) of the pressurized fluid flowing through shut-off valve 100. Thus, when the pressurized fluid entering the inlet passage 122$d$ exceeds the threshold pressure (e.g., 80 psi or greater), and specifically when the force the pressurized fluid imposes on the piston 40 exceeds the biasing force of spring 130, the seat disc diaphragm 150 disengages from valve seat 160 (i.e., seat disc diaphragm 150 is positioned in the unsealed position). Accordingly, shut-off valve 100 is open to enable fluid to flow from the pressurized fluid source through inlet void 122$d$ and out through the bottom outlet passage 122$c$.

Figure 4:
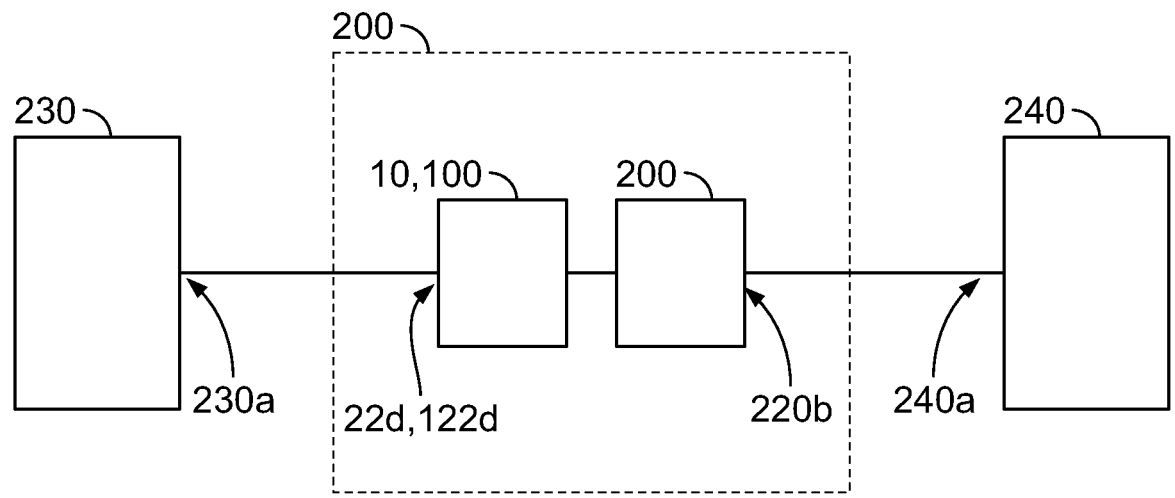
FIG. 4 is a schematic view of a first embodiment of a low-pressure monitoring system that incorporates a low-pressure shut-off valve.

FIG. 4 illustrates one exemplary low-pressure monitoring system 200 which incorporates at least one of shut-off valves 10, 100, discussed above. More specifically, the low-pressure monitoring system 200 includes the shut-off valve 10, 100 and a final line gas regulator 220 connected to and in fluid communication with shut-off valve 10, 100. FIG. 4 schematically illustrates shut-off valve 10, 100 and final line regulator 220. In one exemplary embodiment, the low-pressure monitoring system 200 is configured such that shut-off valve 10, 100 shares a common body (i.e., second piece or lower body 12 and 112) with the final line regulator 220. As such, shut-off valve 10, 100 and the final line regulator 220 are integrated to form a single piece component of the low-pressure monitoring system 200.

As further illustrated in FIG. 4, the low-pressure monitoring system 200 may be configured to connect with and be in fluid communication with a pressurized fluid source 230 and a pressurized-fluid consuming device 240. In one non-limiting example, the pressurized fluid source 230 is a liquefied CO2 cylinder and the pressurized-fluid consuming device 240 is a carbonated beverage machine. However, it will be understood that the low-pressure monitoring system 200 may be used with other pressurized fluid sources and pressurized-fluid consuming devices. In the illustrated example, the liquefied CO2 cylinder 230 is configured to supply pressurized CO2 gas to the carbonated beverage machine 240 and the carbonated beverage machine 240 uses the pressurized CO2 gas to add carbonation to beverages dispensed by the machine.

The liquefied CO2 cylinder 230 supplies pressurized CO2 gas to the carbonated beverage dispensing machine 240 so long as the liquefied CO2 gas cylinder 230 is maintained at a proper pressure and temperature (e.g., 75 psi and −70° F.). However, if the liquefied CO2 cylinder 230 pressure drops below the proper pressure (i.e., 75 psi) the liquefied CO2 within the cylinder 230 solidifies or freezes (i.e., turns the liquefied CO2 into dry ice). Such an event may cause a decrease in and/or stop the production of pressurized CO2 gas. Furthermore, once the liquefied CO2 in cylinder 240 solidifies, the tank usually needs to be serviced and/or replaced in order to restore the pressurized CO2 gas supply. This presents an issue where the liquefied CO2 cylinder 230 needs to be serviced and/or replaced to keep the carbonated beverage machine 240 operational.

Accordingly, the low-pressure monitoring system 200 may provide help in detecting a pressure decrease of the liquefied CO2 cylinder 230 before the liquefied CO2 solidifies or freezes within the cylinder 230. More specifically, shut-off valve 10, 100 may be configured to monitor and detect the pressure of the liquefied CO2 cylinder 230. For example, if the pressure drops below a predetermined low-pressure threshold (e.g., 80 psi), shut-off valve 10, 100 may be configured to shut off the pressurized CO2 gas flow through the final line gas regulator 220 and into the carbonated beverage machine 240.

As illustrated in FIG. 4, shut-off valve 10, 100 is in fluid communication with the liquefied CO2 cylinder 230 and final line gas regulator 220. A fluid conduit is connected to and disposed between a liquefied CO2 cylinder outlet 230$a$ and the inlet passage 22$d$, 122$d$ of shut-off valve 10, 100. Furthermore, shut-off valve 10, 100 is fluidly coupled with the final line gas regulator 220 via an internal passage (not shown) defined within the shared body (i.e., second piece or lower body 12 and 112) of shut-off valve 10, 100 and final line gas regulator 220. In the illustrated example, shut-off valve 10, 100 and final line gas regulator 220 are fluidly coupled to the carbonated beverage machine 240 via a fluid conduit connected to and disposed between a final line gas regulator outlet 220$b$ and a carbonated beverage machine inlet 240$a$ of the carbonated beverage machine 240.

As discussed above, the inlet passage 22$d$, 122$d$ of shut-off valve 10, 100 is in fluid communication with the liquefied CO2 cylinder 230. The inlet passage 22$d$, 122$d$ is also in constant fluid communication with the void 22$g$, 122$g$ such that the pressurized CO2 gas flowing through the inlet passage 22$d$, 122$d$ acts upon piston 40, 140. The pressurized CO2 gas flowing through the inlet passage 22$d$, 122$d$ further acts against a biasing force that spring 30, 130 exerts against piston 40, 140 and the valve seat 60 and 162. If the force that the CO2 gas imposes on the piston 40 exceeds the biasing force of spring 30, 130, the seat disc diaphragm 50, 150 is disengaged from the valve seat 60, 162 and shut-off valve 10, 100 is in the open position. In the illustrated example, when shut-off valve 10, 100 is in the open position, the pressurized CO2 gas generated by the liquefied CO2 cylinder 230 flows through inlet passage 22$d$, 122$d$, out through final line gas regulator outlet 220$b$ and into the carbonated beverage machine inlet 240$a$ of carbonation beverage machine 240.

Alternatively, if the force that the pressurized CO2 gas exerts on the seat disc diaphragm 50, 150 is below the biasing force of spring 30, 130, the seat disc diaphragm 50, 150 is engaged with valve seat 60, 162 and shut-off valve 10, 100 is in the closed position. When shut-off valve 10, 100 is in the closed position, shut-off valve 10, 100 closes off the flow of the CO2 gas that flows into the inlet passage 22$d$, 122$d$. In other words, when shut-off valve 10, 100 is in the closed position, the pressurized CO2 gas may enter shut-off valve 10, 100 through the inlet passage 22$d$, 122$d$ but the pressurized CO2 gas does not flow out through the final line gas regulator outlet 220$b$ and into the carbonated beverage machine inlet 240$a$ of the carbonated beverage machine 240.

In some examples, spring 30, 130 is configured to generate a biasing force that corresponds with a low-pressure threshold (e.g., 80 psi). Thus, when the pressure of the CO2 gas flowing through the inlet passage 22$d$, 122$d$ is above the low-pressure threshold (e.g., 80 psi), the force generated by the pressurized CO2 gas acting on the piston 40, 140 is greater than the biasing force of spring 30, 130. As a result, the seat disc diaphragm 50, 150 is disengaged from the valve seat 60 and 162 and shut-off valve 10, 100 is in the open position. Alternatively, when the pressure of the CO2 gas flowing through the inlet passage 22$d$, 122$d$ is below the low-pressure threshold (e.g., 80 psi), the force generated by the pressurized CO2 gas acting on the piston 40, 140 is less than the biasing force of spring 30, 130. As a result, the seat disc diaphragm 50, 150 is sealingly engaged with the valve seat 60 and 162 and shut-off valve 10, 100 is in the closed position.

Figure 5:
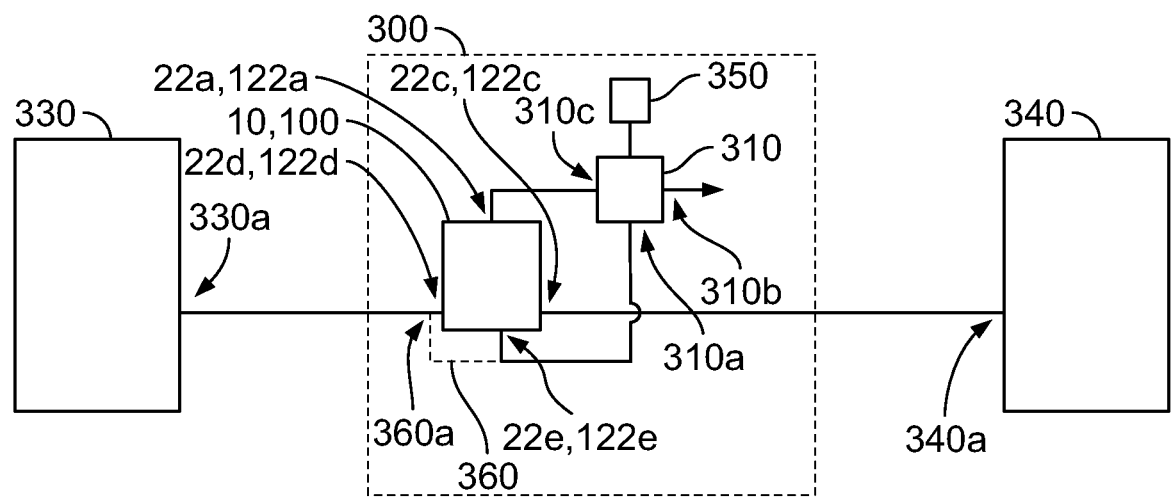
FIG. 5 is a schematic view of the second embodiment of a low-pressure monitoring system that incorporates a low-pressure shut-off valve.

FIG. 5 illustrates another exemplary a low-pressure monitoring system 300 which incorporates at least one of shut-off valves 10, 100, discussed above. More specifically, the low-pressure monitoring system 300 includes the shut-off valve 10, and 100, a solenoid valve 310 connected to and in fluid communication with shut-off valve 10, 100, and a gas monitoring device 350 (e.g., CO2 monitoring device) connected to and in electrical communication with the solenoid valve 310. As discussed in detail below, solenoid valve 310 is depicted as a normally closed 3-way solenoid. In the illustrated example, the low-pressure monitoring system 300 is shown without a final line gas regulator (e.g., final line gas regulator 220 of FIG. 4). However, it will be understood that other embodiments of low-pressure monitoring system 300 may include a final line gas regulator incorporated with shut-off valve 10, 100, as described above.

As further illustrated in FIG. 5, low-pressure monitoring system 300 may be configured to connect with and be in fluid communication with a pressurized fluid source 330 and a pressurized-fluid consuming device 340. In one non-limiting example, the pressurized fluid source 330 is a liquefied CO2 cylinder and the pressurized-fluid consuming device 340 is a carbonated beverage machine. However, it will be understood that low-pressure monitoring system 300 may be used with other pressurized fluid sources and pressurized-fluid consuming devices. In the illustrated example, liquefied CO2 cylinder 330 is configured to supply pressurized CO2 gas to carbonated beverage machine 340 and the carbonated beverage machine 340 uses the pressurized CO2 gas to add carbonation to beverages dispensed by the machine.

The liquefied CO2 cylinder 330 supplies CO2 gas to the carbonated beverage dispensing machine 340 so long as the liquefied CO2 is maintained at a specified pressure and temperature (e.g., 75 psi and −70° F.) within the liquefied CO2 cylinder 330. However, if the pressure within the liquefied CO2 cylinder 330 drops below the specified pressure (i.e., 75 psi) the liquefied CO2 solidifies or freezes (i.e., turns the liquefied CO2 into dry ice). Such an event may cause a decrease and/or stop the production of CO2 gas by the liquefied CO2 cylinder 330. Furthermore, once the liquefied CO2 in the cylinder 330 solidifies the tank usually needs to be replaced in order to restore the CO2 gas supply. This presents an issue where the liquefied CO2 cylinder 230 needs to be serviced and/or replaced to keep the carbonated beverage machine 340 operational.

Accordingly, the low-pressure monitoring system 300 may provide help in detecting a pressure decrease of the liquefied CO2 cylinder 330 before the liquefied CO2 solidifies or freezes within the cylinder 330. More specifically, shut-off valve 10, 100 may be configured to monitor and detect the pressure of the liquefied CO2 cylinder 330. Shut-off valve 10, 100 may be further configured to shut off the pressurized CO2 gas flow to the carbonated beverage machine 340 if the pressure drops below the predetermined low-pressure threshold (e.g., 80 psi).

As illustrated in FIG. 5, shut-off valve 10, 100 is in fluid communication with the liquefied CO2 cylinder 330 via a fluid conduit connected to and disposed between a liquefied CO2 cylinder outlet 330a and inlet passage 22d, 122d of shut-off valve 10, 100. Furthermore, a fluid conduit is connected to and disposed between the outlet passage 22c, 122c of shut-off valve 10, 100 and a carbonated beverage machine inlet 340a of the carbonated beverage machine 340. In the illustrated example, shut-off valve 10, 100 further includes the second outlet passage 22e and 122e defined within body 20, 120. The second outlet passage 22e, 122e is fluidly connected to the inlet passage 22d, 122d such that the inlet passage 22d, 122d and second outlet passage 22e, 122e collectively define the second fluid pathway (shown schematically) through shut-off valve 10, 100.

Shut-off valve 10, 100 is fluidly connected to solenoid valve 310 via a fluid conduit connected to and disposed between the second outlet passage 22e and 122e and a valve inlet passage 310a of solenoid valve 310. The solenoid valve 310 further includes a first valve outlet 310b and a second valve outlet 310c. The first valve outlet 310b defines a relief port of the solenoid valve 310 and the second valve outlet 310c is fluidly coupled to shut-off valve 10, 100 via a fluid conduit connected to and disposed between the second valve outlet 310c and the inlet passage 22a and 122a of shut-off valve 10, 100.

Alternatively, the solenoid valve 310 may be fluidly coupled to the liquefied CO2 cylinder 330 via an external fluid pathway that bypasses shut-off valve 10, 100, shown by dotted line 360. The external fluid pathway 360 may include a T-connector 360a, or other such connector, that is connected to the fluid conduit connected to and disposed between the liquefied CO2 cylinder outlet 330a and the inlet passage 22d, 122d of shut-off valve 10, 100. The T-connector 360a may be fluidly coupled to the fluid conduit upstream from inlet passage 22d, 122d of shut-off valve 10, 100. As such, the external fluid pathway 360 bypasses shut-off valve 10, 100 and the external fluid pathway 360 is fluidly connected to and disposed between the T-connector 360a and the valve inlet 310a of the solenoid valve 310.

As discussed above, shut-off valve 10, 100 of the low-pressure monitoring system 300 is configured to monitor and detect the pressure within the liquefied CO2 cylinder 330 and shut off the CO2 gas flow to the carbonated beverage machine 340 if the pressure drops below the predetermined low-pressure threshold (e.g., 80 psi). Additionally, the CO2 gas monitor 350 is configured to monitor a CO2 level in the environment of the liquefied CO2 gas cylinder 330 and the carbonated beverage machine 340 (e.g., predefined area surrounding the gas cylinder and beverage machine). For example, if CO2 gas monitor 350 detects an elevated CO2 level in the surrounding environment the CO2 gas monitor 350 sends a signal to open solenoid valve 310 causing the shut-off valve 10, 100 to close, as discussed in more detail below.

In the illustrated example, solenoid valve 310 may be configured as a normally closed 3-way solenoid valve that is electrically coupled to the CO2 gas monitor 350. The solenoid valve 310 receives electrical input (e.g., electrical signal) from CO2 gas monitor 350 based on the CO2 measurement of the surrounding environment collected by CO2 gas monitor 350.

In a first mode of operation, CO2 gas monitor 350 determines that there is a normal CO2 level in environment surrounding liquefied CO2 gas cylinder 330 and/or carbonated beverage machine 340. The CO2 gas monitor 350 identifies a normal CO2 level in the surrounding environment by determining that the collected CO2 measurement is less than a predefined CO2 level associated with an elevated level. Accordingly, the CO2 gas monitor 350 sends a signal to close the solenoid valve 310. In turn, the solenoid valve outlets 310c and 310b are open to one another. In this example, inlet passage 22a, 122a of valve 10, 100 is therefore connected to solenoid outlet 310b, which may be vented to atmosphere, or in a different embodiment transported via a fluid conduit to another location. Solenoid inlet 310a is closed in this position.

As noted above, inlet passage 22d, 122d of shut-off valve 10, 100 is in fluid communication with the liquefied CO2 cylinder 330, and with void 22g, 122g such that the pressurized CO2 gas flowing through inlet passage 22d, 122d acts upon the piston 40, 140. If the force that the pressurized CO2 gas exerts on the piston 40, 140 exceeds the biasing force of spring 30, 130, the seat disc diaphragm 50, 150 is disengaged from the valve seat 60, 162 and shut-off valve 10, 100 is in the open position. In the illustrated example, when shut-off valve 10, 100 is in the open position, the pressurized CO2 gas generated by the liquefied CO2 cylinder 330 flows through the inlet passage 22d, 122d, out through outlet passage 22c, 122c and into carbonated beverage machine inlet 340a of the carbonated beverage machine 340. The pressurized CO2 gas generated by the liquefied CO2 cylinder 330 is also connected to valve inlet 310a of solenoid valve 310, as noted above.

If the force that the CO2 gas exerts on the piston 40, 140 is below the biasing force of spring 30, 130, seat disc diaphragm 50, 150 is engaged with valve seat 60, 162 and shut-off valve 10, 100 is in the closed position, closing off the CO2 gas flow to carbonated beverage machine 340. However, as configured, the flow of pressurized CO2 gas may still be connected to valve inlet 310a of solenoid valve 310.

In a second mode of operation, the CO2 gas monitor 350 determines that there is an elevated CO2 level in the environment surrounding liquefied CO2 cylinder 330 and/or carbonated beverage machine 340. The CO2 gas monitor 350 identifies an elevated CO2 level in the surrounding environment by determining that the collected CO2 measurement is greater than or equal to the predefined CO2 level associated with an elevated level. An elevated CO2 level may indicate a leak or other such abnormal condition with the liquefied CO2 cylinder 330 and/or carbonated beverage machine 340. When the CO2 gas monitor 350 detects an elevated level of CO2, the CO2 gas monitor 350 sends a signal to open the solenoid valve 310. That is, the solenoid value 310 is controlled, via the electrical signal (or lack of the electrical signal) received from the CO2 gas monitor 350, to open solenoid valve 310 such that the CO2 gas flows through valve inlet 310a, out through second valve outlet 310c and into inlet passage 22a and 122a of shut-off valve 10, 100. The CO2 gas monitor 350 may also activate an audible or visual alarm to indicate that an elevated CO2 level has been detected.

At this point, inlet passage 22a, 122a of shut-off valve 10, 100 is in fluid communication with the liquefied CO2 cylinder 230 via the solenoid valve 310. As described above with respect to shut-off valve 10, 100, the inlet passage 22a and 122a is also in fluid communication with the void 22g and 122g defined within body 20 and 120 which houses spring 30, 130. Thus, the CO2 gas flowing through inlet passage 22a, 122a acts upon the spring side of piston 40, 140 opposite the seat disc diaphragm 50, 150. Furthermore, the CO2 gas flowing through the inlet passage 22a, 122a combines with the biasing force that spring 30, 130 exerts against piston 40, 140 and the valve seat 60, 162.

The force exerted by the CO2 gas flowing through inlet passage 22a, 122a on the spring side of piston 40, 140 is substantially equal to the force exerted on the piston 40, 140 by the CO2 gas flowing through inlet passage 22d, 122d. Thus, the force exerted on the spring side of piston 40, 140 combined with the biasing force of spring 30, 130 exceeds the force exerted on the piston 40, 140 by the CO2 gas pressure in the inlet passage 22d, 122d. As a result, piston 40, 140 is forced axially downward via spring 30, 130 such that the seat disc diaphragm 50, 150 engages with valve seat 60, 162 to close shut-off valve 10, 100. In the illustrated example, when shut-off valve 10, 100 is in the closed position, the CO2 gas generated by the liquefied CO2 cylinder 230 is cut off from flowing out through the outlet passage 22c, 122c of shut-off valve 10, 100 and into the carbonated beverage machine inlet 340a of the carbonated beverage machine 340.

An example disclosed pressurized-gas low-pressure detection and shut-off system comprises a low-pressure shut-off valve including a first valve inlet, a second valve inlet and at least one valve outlet. The example disclosed pressurized-gas low-pressure detection and shut-off system also comprises a solenoid valve including a valve inlet, a first valve outlet, and a second valve outlet. The second valve outlet is connected to and in fluid communication with the first valve inlet of the low-pressure shut-off. The solenoid is configured to direct a flow of a pressurized gas from the valve inlet into at least one of the first valve outlet and the second valve outlet. The example disclosed pressurized-gas low-pressure detection and shut-off system also comprises a gas monitor electrically coupled to the solenoid valve. The gas monitor is configured to transmit one of a first signal and a second signal to the solenoid valve to control the flow of the pressurized gas through the solenoid valve.

In some examples, the first signal from the gas monitor is configured to control the solenoid valve to direct the flow of the pressurized gas through the first valve outlet of the solenoid valve. In some examples, the second signal from the gas monitor is configured to control the solenoid valve to direct the flow of the pressurized gas through the second valve outlet of the solenoid valve and into the first valve inlet of the low-pressure shut-off.

In some examples, the gas monitor is configured to detect one of a normal amount of CO2 in the air of an area surrounding the gas monitor and an elevated amount of CO2 in the air of the area surrounding the gas monitor. In some such examples, wherein the gas monitor is configured to transmit the first signal when the normal amount of CO2 is detected in the area surrounding the gas monitor. In some such examples, the gas monitor is configured to transmit the second signal when the elevated amount of CO2 is detected in the area surrounding the gas monitor.

An example disclosed pressurized-fluid low-pressure detection and shut-off system comprises a low-pressure shut-off valve. The low-pressure shut-off valve includes a first shut-off inlet, a second shut-off inlet configured to receive pressurized fluid from a pressurized fluid source, and a shut-off outlet configured to provide the pressurized fluid to a pressurized-fluid consuming device. The example disclosed pressurized-fluid low-pressure detection and shut-off system also comprises a solenoid valve. The solenoid valve includes a solenoid inlet configured to receive the pressurized fluid and a solenoid outlet configured to fluidly connect to the first shut-off inlet of the low-pressure shut-off valve. The solenoid is configured to selectively permit fluid flow direct the pressurized fluid from the solenoid inlet to the solenoid outlet. The example disclosed pressurized-fluid low-pressure detection and shut-off system also comprises a gas monitor electrically coupled to the solenoid valve. The gas monitor is configured to transmit one of a first signal and a second signal to the solenoid valve to control the flow of the pressurized fluid to the pressurized-fluid consuming device via the shut-off valve.

In some examples, the solenoid inlet is configured to fluid connect to the pressurized fluid source via a fluid pathway external to the low-pressure shut-off valve to receive the pressurized fluid. In some examples, the low-pressure shut-off valve includes a second shut-off outlet fluidly that is fluidly connected to the second shut-off inlet and is configured to fluidly connect to the solenoid inlet to provide the pressurized fluid to the solenoid valve. In some examples, the solenoid valve is a normally-closed 3-way solenoid valve and includes a second solenoid outlet that defines a relief port.

In some examples, the pressurized fluid is pressurized $CO_2$ and the gas monitor is configured to collect a $CO_2$ measurement of $CO_2$ in the air of an area surrounding the gas monitor. In some such examples, in response to determining that the $CO_2$ measurement is less than a predefined $CO_2$ threshold, the gas monitor is configured to transmit the first signal to the solenoid valve. Further, in some such examples, in response to receiving the first signal, the solenoid valve is configured to close the solenoid input to prevent the solenoid outlet of the solenoid valve from providing the pressurized fluid to the first shut-off inlet of the low-pressure shut-off valve. Further, in some such examples, in response to determining that the $CO_2$ measurement is greater than or equal to the predefined $CO_2$ threshold, the gas monitor is configured to transmit the second signal to the solenoid valve. Moreover, in some such examples, in response to receiving the second signal, the solenoid valve is configured to open fluid flow between the solenoid input and the solenoid outlet to cause the solenoid outlet to provide the pressurized fluid to the first shut-off inlet of the low-pressure shut-off valve.

In some examples, the solenoid valve is configured to prevent the shut-off valve from providing the pressurized fluid to the pressurized-fluid consuming device when the solenoid inlet is in fluid communication with the solenoid outlet. In some such examples, the solenoid valve is configured to permit the shut-off valve to provide the pressurized fluid to the pressurized-fluid consuming device when the solenoid inlet is closed from the solenoid outlet.

In some examples, the low-pressure shut-off valve further includes a piston, a seat disc diaphragm connected to the piston, and a spring biasing the piston. The spring and the first shut-off inlet is located on a first side of the piston and the first shut-off inlet are located on a first side of the piston. The second shut-off inlet is located on an opposing second side of the piston. In some such examples, when the solenoid outlet of the solenoid valve provides the pressurized fluid to the first shut-off inlet of the low-pressure shut-off valve, pressure is equalized between the first side and the second side of the piston to cause the spring to close the seat disc diaphragm connected to the piston and prevent the shut-off outlet from providing the pressurized fluid to the pressurized-fluid consuming device. In some such examples, when the solenoid valve prevents the solenoid outlet from providing the pressurized fluid to the first shut-off inlet of the low-pressure shut-off valve, the seat disc diaphragm connected to the piston is configured to open in response to pressure on the first side of the piston exceeding a predefined pressure threshold associated with a biasing force of the spring. The shut-off outlet is configured to provide the pressurized fluid to the pressurized-fluid consuming device when the seat disc diaphragm of the shut-off valve is open.

While specific embodiments have been described in detail, it will be appreciated by those skilled in the art that various modifications and alternatives to those presented herein could be developed in light of the overall teachings of the disclosure. Accordingly, the particular arrangements disclosed are meant to be illustrative only and not limiting as to the scope of the invention which is to be given the full breadth of the appended claims and any equivalent thereof

What is claimed is:

1. A pressurized-gas low-pressure detection and shut-off system, comprising:
    a low-pressure shut-off valve including a first valve inlet, a second valve inlet and at least one valve outlet;
    a solenoid valve including a valve inlet, a first valve outlet, and a second valve outlet, the second valve outlet connected to and in fluid communication with the first valve inlet of the low-pressure shut-off valve, the solenoid valve configured to direct a flow of a pressurized gas from the valve inlet into at least one of the first valve outlet and the second valve outlet; and
    a gas monitor electrically coupled to the solenoid valve, wherein the gas monitor is configured to collect a measurement of the pressurized gas in an area surrounding the gas monitor and, based on that measurement, transmit one of a first signal and a second signal to the solenoid valve to control the flow of the pressurized gas through the solenoid valve.

2. The pressurized-gas low-pressure detection and shut-off system of claim 1, wherein the first signal from the gas monitor is configured to control the solenoid valve to direct the flow of the pressurized gas through the first valve outlet of the solenoid valve.

3. The pressurized-gas low-pressure detection and shut-off system of claim 1, wherein the second signal from the gas monitor is configured to control the solenoid valve to direct the flow of the pressurized gas through the second valve outlet of the solenoid valve and into the first valve inlet of the low-pressure shut-off valve.

4. The pressurized-gas low-pressure detection and shut-off system of claim 1, wherein the gas monitor is configured to detect one of a normal amount of $CO_2$ in the area surrounding the gas monitor and an elevated amount of $CO_2$ in the area surrounding the gas monitor.

5. The pressurized-gas low-pressure detection and shut-off system of claim 4, wherein the gas monitor is configured to transmit the first signal when the normal amount of $CO_2$ is detected in the area surrounding the gas monitor.

6. The pressurized-gas low-pressure detection and shut-off system of claim 4, wherein the gas monitor is configured to transmit the second signal when the elevated amount of $CO_2$ is detected in the area surrounding the gas monitor.

7. A pressurized-fluid low-pressure detection and shut-off system, comprising:
    a low-pressure shut-off valve including:
        a first shut-off inlet;
        a second shut-off inlet configured to receive pressurized fluid from a pressurized fluid source; and
        a shut-off outlet configured to provide the pressurized fluid to a pressurized-fluid consuming device;
    a solenoid valve including:
        a solenoid inlet configured to receive the pressurized fluid; and
        a solenoid outlet configured to fluidly connect to the first shut-off inlet of the low-pressure shut-off valve, wherein the solenoid valve is configured to selectively permit fluid flow from the solenoid inlet to the solenoid outlet; and
    a gas monitor electrically coupled to the solenoid valve, wherein the gas monitor is configured to collect a measurement of the pressurized fluid in an area surrounding the gas monitor and, based on that measurement, transmit one of a first signal and a second signal to the solenoid valve to control the flow of the pressurized fluid to the pressurized-fluid consuming device via the low-pressure shut-off valve.

8. The pressurized-fluid low-pressure detection and shut-off system of claim 7, wherein the solenoid inlet is configured to fluid connect to the pressurized fluid source via a fluid pathway external to the low-pressure shut-off valve to receive the pressurized fluid.

9. The pressurized-fluid low-pressure detection and shut-off system of claim 7, wherein the low-pressure shut-off valve includes a second shut-off outlet fluidly that is fluidly connected to the second shut-off inlet and is configured to fluidly connect to the solenoid inlet to provide the pressurized fluid to the solenoid valve.

10. The pressurized-fluid low-pressure detection and shut-off system of claim 7, wherein the solenoid valve is a normally-closed 3-way solenoid valve and includes a second solenoid outlet that defines a relief port.

11. The pressurized-fluid low-pressure detection and shut-off system of claim 7, wherein the pressurized fluid is pressurized $CO_2$.

12. The pressurized-fluid low-pressure detection and shut-off system of claim 11, wherein, in response to determining that the $CO_2$ measurement is less than a predefined $CO_2$ threshold, the gas monitor is configured to transmit the first signal to the solenoid valve.

13. The pressurized-fluid low-pressure detection and shut-off system of claim 12, wherein, in response to receiving the first signal, the solenoid valve is configured to close the solenoid inlet to prevent the solenoid outlet of the solenoid valve from providing the pressurized fluid to the first shut-off inlet of the low-pressure shut-off valve.

14. The pressurized-fluid low-pressure detection and shut-off system of claim 12, wherein, in response to determining that the $CO_2$ measurement is greater than or equal to the predefined $CO_2$ threshold, the gas monitor is configured to transmit the second signal to the solenoid valve.

15. The pressurized-fluid low-pressure detection and shut-off system of claim 14, wherein, in response to receiving the second signal, the solenoid valve is configured to open fluid flow between the solenoid inlet and the solenoid outlet to cause the solenoid outlet to provide the pressurized fluid to the first shut-off inlet of the low-pressure shut-off valve.

16. The pressurized-fluid low-pressure detection and shut-off system of claim 7, wherein the solenoid valve is configured to prevent the low-pressure shut-off valve from providing the pressurized fluid to the pressurized-fluid consuming device when the solenoid inlet is in fluid communication with the solenoid outlet.

17. The pressurized-fluid low-pressure detection and shut-off system of claim 16, wherein the solenoid valve is configured to permit the low-pressure shut-off valve to provide the pressurized fluid to the pressurized-fluid consuming device when the solenoid inlet is closed from the solenoid outlet.

18. The pressurized-fluid low-pressure detection and shut-off system of claim 7, wherein the low-pressure shut-off valve further includes a piston, a seat disc diaphragm connected to the piston, and a spring biasing the piston, wherein the spring and the first shut-off inlet is located on a first side of the piston and the first shut-off inlet are located on a first side of the piston, wherein the second shut-off inlet is located on an opposing second side of the piston.

19. The pressurized-fluid low-pressure detection and shut-off system of claim 18, wherein when the solenoid outlet of the solenoid valve provides the pressurized fluid to the first shut-off inlet of the low-pressure shut-off valve, pressure is equalized between the first side and the second side of the piston to cause the spring to close the seat disc diaphragm connected to the piston and prevent the shut-off outlet from providing the pressurized fluid to the pressurized-fluid consuming device.

20. The pressurized-fluid low-pressure detection and shut-off system of claim 18, wherein, when the solenoid valve prevents the solenoid outlet from providing the pressurized fluid to the first shut-off inlet of the low-pressure shut-off valve, the seat disc diaphragm connected to the piston is configured to open in response to pressure on the first side of the piston exceeding a predefined pressure threshold associated with a biasing force of the spring, wherein the shut-off outlet is configured to provide the pressurized fluid to the pressurized-fluid consuming device when the seat disc diaphragm of the low-pressure shut-off valve is open.

* * * * *